United States Patent
Chen et al.

(10) Patent No.: US 9,690,142 B2
(45) Date of Patent: Jun. 27, 2017

(54) DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Chuanbao Chen, Beijing (CN); Yan Wang, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/737,626

(22) Filed: Jun. 12, 2015

(65) Prior Publication Data

US 2016/0116769 A1    Apr. 28, 2016

(30) Foreign Application Priority Data

Oct. 24, 2014   (CN) .......................... 2014 1 0577391

(51) Int. Cl.
    *G02F 1/1339*     (2006.01)
(52) U.S. Cl.
    CPC ........ *G02F 1/1339* (2013.01); *G02F 1/13394* (2013.01); *G02F 2001/13398* (2013.01)
(58) Field of Classification Search
    CPC .... G02F 1/1333; G02F 1/1335; G02F 1/1337; G02F 1/136; G02F 1/13394;
    (Continued)

(56) References Cited

U.S. PATENT DOCUMENTS 7,433,011 B2 * 10/2008 Liao ...................... G02F 1/1339
                                                    349/153
7,528,916 B2 *  5/2009 Chen .................... G02F 1/1337
                                                    349/123
(Continued)

FOREIGN PATENT DOCUMENTS

CN         1614480 A      5/2005
CN         1673822 A      9/2005
(Continued)

OTHER PUBLICATIONS

First Chinese Office Action dated Jul. 4, 2016; Appln. No. 201410577391.3.

(Continued)

*Primary Examiner* — Thoi Duong
(74) *Attorney, Agent, or Firm* — Ladas & Parry LLP

(57) ABSTRACT

A display device includes a first substrate provided with a first alignment film and a second substrate provided with a second alignment film, which are cell-assembled and sealed by sealant. A separating wall is provided between the first substrate and the second substrate and is further located between a display area and the sealant. The separating wall extends through the first alignment film and the second alignment film to separate the sealant and alignment films in the display area. The display device can avoid contamination of alignment films in the display area and enhance the display quality of the display device.

14 Claims, 1 Drawing Sheet

(58) Field of Classification Search
CPC ............... G02F 1/1339; G02F 1/1341; G02F 1/133305; G02F 1/133711; G02F 1/133345; G02F 1/133512; G02F 1/133514; G02F 1/1362; G02F 2001/133388; G02F 2001/13398; G02F 2001/133565
USPC ....... 349/106, 123, 153, 187, 156, 155, 110, 349/138, 158, 43
See application file for complete search history.

(56) References Cited

U.S. PATENT DOCUMENTS

| | | | |
|---|---|---|---|
| 7,714,975 B1 * | 5/2010 | Yamazaki | G02F 1/13394 349/123 |
| 2002/0051112 A1 * | 5/2002 | Katsura | G02F 1/1337 349/153 |
| 2002/0075441 A1 | 6/2002 | Fujimori et al. | |
| 2005/0117108 A1 * | 6/2005 | Kume | G02F 1/133707 349/156 |
| 2008/0278670 A1 * | 11/2008 | Abe | G02F 1/133377 349/144 |

FOREIGN PATENT DOCUMENTS

| | | |
|---|---|---|
| CN | 101290417 A | 10/2008 |
| CN | 101320173 A | 12/2008 |
| CN | 102650773 A | 8/2012 |
| JP | 2002-072220 A | 3/2002 |
| TW | 200725026 A | 7/2007 |
| TW | I306530 B | 2/2009 |

OTHER PUBLICATIONS

Secong Chinese Office Action dated Dec. 5, 2016; Appln. No. 201410577391.3.

\* cited by examiner

DISPLAY DEVICE

TECHNICAL FIELD

Embodiments of the present disclosure relate to a display device.

BACKGROUND

With the development of electronic technology, performance demands for display products are becoming higher and higher, and display products with larger viewing ranges are needed. A present liquid crystal display mainly comprises a color filter substrate and an array substrate as well as a liquid crystal layer filled between these two substrates.

SUMMARY

One embodiment of the present disclosure provides a display device including a first substrate provided with a first alignment film and a second substrate provided with a second alignment film; the first substrate and the second substrate are cell-assembled and sealed by sealant, a separating wall is provided between the first substrate and the second substrate and is further disposed between a display area and the sealant; the separating wall extends through the first alignment film and the second alignment film to separate the sealant and alignment films in the display area.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should he within the scope of the disclosure.

Unless otherwise defined, all the technical and scientific terms used herein have the same meanings as commonly understood by one of ordinary skill in the art, to which the present disclosure belongs. "On," "under," "right," "left" and the like are only used to indicate relative position relationship between described members, and when the position of the object which is described is changed, the relative position relationship may be changed accordingly.

Figure 1:
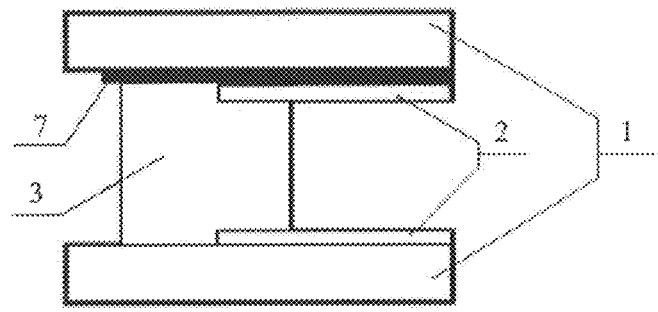
FIG. 1 is a schematic diagram of internal structure of a liquid crystal display device.

FIG. 1 is a schematic diagram of internal structure of a liquid crystal display device. As shown in FIG. 1, the liquid crystal display device is provided with alignment films 2 (typically of organic material) on both the top and the bottom substrates 1, and multiple minute grooves are formed by, for example, rubbing on alignment films, along which liquid crystal disposed between substrates 1 can be initially aligned. During operation, an electric field is formed by electrodes formed on substrates 1, and alignment of liquid crystal is controlled by the electric field to display pictures. Two substrates 1 are fixed by sealant 3 such as an organic material and a liquid crystal layer is sealed between the two substrates 1 to obtain a liquid crystal cell.

If the visible range of a display device becomes larger, that is, the display area becomes larger and the margin frame becomes narrower, the area occupied by alignment films becomes larger accordingly. Then it is possible that overlapping parts appear between alignment films and sealant, causing mixing of sealant and organic material in alignment films, which may result in contamination to the parts of the alignment films in the display area and impact the display quality of the resultant display device.

A display device according to an embodiment of the present disclosure will be described in detail below with reference to accompanying drawings.

Figure 2:
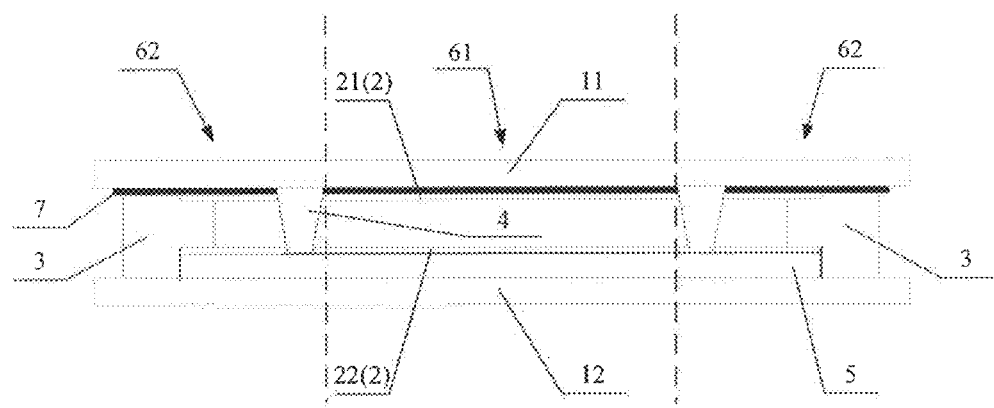
FIG. 2 is a schematic diagram of internal structure of a display device provided in an embodiment of the present disclosure.

An embodiment of the present disclosure provides a display device as shown in FIG. 2, including a first substrate 11 provided with a first alignment film 21 and a second substrate 12 provided with a second alignment film 22 which are assembled together and sealed by sealant 3 to form a cell. A separating wall 4 is provided between the first substrate 11 and the second substrate 12, and this separating wall is further disposed between the display area 61 and the sealant 3 and extends through the first alignment film 21 and the second alignment film 22 to separate the sealant 3 and the alignment films 2 (21 and 22) in the display area 61.

As shown in the figure, the separating wall 4 extends through the first alignment film 21 and the second alignment film 22 and for example contacts the bottom layers of the first alignment film 21 and the second alignment film 22 respectively.

In the display device provided in the embodiment of the present disclosure, the first substrate provided with first alignment film and the second substrate provided with second alignment film are assembled together and sealed by sealant to form a cell; and separating wall extending through the first alignment film and the second alignment film are provided between the first substrate and the second substrate for separating the sealant and alignment films in the display area. As can be known from analysis, the separating wall effectively separates the sealant, the alignment films in non-display area, and the alignment films in display area. Therefore, after the organic material in the sealant enters the alignment films in non-display area via the overlapping area, it can not continue to contact and mix with the alignment films in the display area, thereby avoiding contamination of alignment films in the display area. Therefore, the display device according to the embodiment of the present disclosure can further ensure the display quality of display device and enhance the overall performance of the display device while satisfying the design requirements for a large visible range of the display device.

It is to be noted here that in order to realize a display device with a narrow margin frame and enhance display performance of the display device, it is necessary to guarantee the uniformity of alignment films in the display area to thereby extend alignment films in the display area to the non-display area. In addition, in the present disclosure, on the top substrate, the alignment films 2 in the display area 61 and the alignment films 2 in the non-display area 62 are both parts of the first alignment film 21, for example, both constituting the whole first alignment film 21. Similarly, on the bottom substrate, the alignment films 2 in the display area 61 and the alignment films 2 in the non-display area 62 are both parts of the second alignment film 22, for example, both constituting the whole second alignment film 22.

In order to better explain the operation principle of the present disclosure, a liquid crystal display device is described as an example in the present embodiment in which the first substrate 11 may be a color filter substrate 11 and the second substrate 12 may be an array substrate 12.

In order to facilitate the process and manufacturing, as shown in FIG. 2, the above-mentioned separating wall 4 may be preferably disposed at the boundary between the display area 61 and the non-display area 62 to effectively separate the alignment films 2 in the display area 61 and the alignment films 2 in the non-display area 62 and prevent the alignment films 2 in the non-display area 62 that is contaminated by the sealant 3 from continuing contaminating the alignment films 2 in the display area 61. Of course, specific locations for providing the separating wall 4 may not be limited here, as long as they are located at reasonable positions in the non-display area 62 and can effectively function for separating and blocking contamination.

In order to save the material for manufacturing the separating wall 4 and reducing their manufacturing costs, as shown in FIG. 2, for example, the above-mentioned separating wall 4 may have one end surface fixed onto the color filter substrate 11 and the other end surface attached to the film layer 5 on the array substrate 12. For example, the film layer 5 may be disposed at a location under and adjacent to the second alignment film 22 so as to reduce the height of separating wall 4 in the longitudinal direction, simplify the process and reduce the manufacturing costs of the display device while guaranteeing that the separating wall 4 can function to separate alignment films in the display area 61 and alignment films 2 in the non-display area 62.

It is noted that, because structure members such as common electrodes and TFTs are provided on the array substrate 12, one end surface of the separating wall 4 is generally fixed onto the color filter substrate 11 such that the other end surface of the separating wall 4 is attached to the corresponding film layer on the array substrate 12 when the color filter substrate 11 and the array substrate 12 are cell-assembled, thereby functioning for separation. Of course, in practice, it is also possible to fix the separating wall 4 onto the array substrate 12 beforehand while not damaging the normal use of the array substrate.

Figure 3:
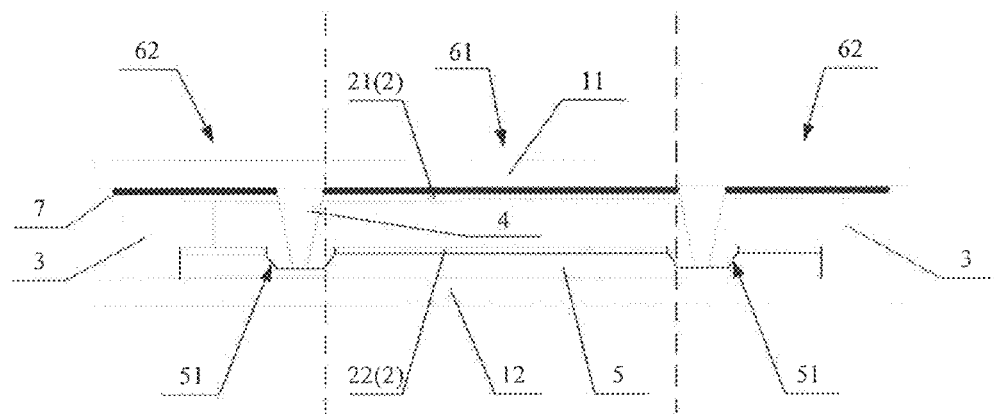
FIG. 3 is a schematic diagram of internal structure of another display device provided in an embodiment of the present disclosure.

Preferably, when the second substrate 12 is the array substrate 12, the film layer 5 is generally an insulating layer. In order to better secure the separating wall 4 and enhance the separation effect at the same time, as shown in FIG. 3, a groove 51 for accommodating the above-mentioned separating wall 4 may be provided in the insulating layer. For example, in the display device provided in the embodiment of the present disclosure, the groove 51 in the insulating layer may be manufactured by etching the insulating layer; a surface of the groove 51 that contacts the separating wall 4 may be of a rectangular shape and may have a width matching the width of the separating wall 4 such that one end surface of the separating wall 4 may be mounted fixedly in the groove 51. The groove 51 can realize good fixing effect and prevent the separating wall 4 from shifting and dislocating, which will otherwise impact subsequent overall assembling of the display device. Of course, the specific manufacturing process for the groove 51 is not limited here and may be other effective manufacturing means.

In order to facilitate manufacturing and assembling of the separating wall 4, for example, the above-mentioned separating wall 4 may be formed of a resin material, preferably a photoresist material. For example, when the separating wall 4 is of a photoresist material, the separating wall 4 may be manufactured by subjecting the coated photoresist to processes such as exposure, development and etching.

It is to be noted here that since the groove(s) 51 in the film layer 5 in the display device provided in the embodiment of the present disclosure is manufactured by etching, its cross section may be of an inverted trapezoid structure, as shown in FIG. 3. Furthermore, since the separating wall 4 is manufactured by subjecting photoresist to exposure, development and etching, the groove 51 in the film layer 5 may have a bottom size matching the size of the largest contact surface of photoresist in vertical direction, that is, the groove 51 has a bottom size consistent with the coating area of photoresist, thereby guaranteeing that the groove 51 can accommodate the separating wall 4 well. Of course, the specific structure of the groove 51 is not limited here, and it may be in other reasonable structures.

When the separating wall 4 is made of photoresist material, in order to reduce the cost of masks in the manufacturing process, the separating wall 4 in the display device provided in the embodiment of the present disclosure may have a cross section of inverted conical structure (inverted trapezoid structure), as shown in FIGS. 2 to 3. Of course, the specific structure of the separating wall 4 is not limited here, and it may also be of a cubic structure (with square section) etc.

In practice, a black matrix 7 may be provided on the internal surface of color filter substrate 11, which is located between the first alignment film 21 and the first substrate 11, as shown by the black regions in FIGS. 2 to 3. The black matrix 7 may be formed with transmission regions by exposure process etc. to implement display function of the display device.

It is to be noted here that, while manufacturing and assembling the display device provided in the embodiment of the present disclosure, it is possible to manufacture the separating wall 4 firstly and then the first alignment film 21 on the first substrate 11; then allow the separating wall 4 to extend through the second alignment film 22 and be fixed in the groove 51 in the film layer 5 on a side of the second substrate 12 while cell-assembling the first substrate 11 and the second substrate 12 with sealant; and finally assembly the display device by the outer margin frame.

What are described above is related to the illustrative embodiments of the disclosure only and not limitative to the scope of the disclosure; the scopes of the disclosure are defined by the accompanying claims.

The present application claims priority of China Patent application No. 201410577391.3 filed on Oct. 24, 2014, the content of which is incorporated in its entirety as part of the present application by reference herein.

What is claimed is:

1. A display device comprising a first substrate provided with a first alignment film and a second substrate provided with a second alignment film,
    wherein the first substrate and the second substrate are cell-assembled and sealed by sealant, a separating wall is provided between the first substrate and the second substrate and is further disposed between a display area and the sealant; and wherein the separating wall extends through both the first alignment film and the second alignment film outside the display area such that the sealant and alignment films in the display area are separated by the separating wall, wherein a space outside the display area is formed between the separating wall and the sealant, and a portion of the first alignment film and a portion of the second alignment film exist in the space.

2. The display device of claim 1, wherein the separating wall has one end surface fixed onto the first substrate and another end surface attached to a film layer on the second substrate; and the film layer is located at a position under and adjacent to the second alignment film.

3. The display device of claim 2, wherein the film layer is an insulating layer and a groove for accommodating the separating wall is provided on the insulating layer.

4. The display device of claim 3, wherein the separating wall is of a photoresist material.

5. The display device of claim 4, wherein the separating wall has a cross section of inverted conical structure.

6. The display device of claim 3, wherein the first substrate is a color filter substrate and the second substrate is an array substrate.

7. The display device of claim 2, wherein the separating wall is of a photoresist material.

8. The display device of claim 7, wherein the separating wall has a cross section of inverted conical structure.

9. The display device of claim 2, wherein the first substrate is a color filter substrate and the second substrate is an array substrate.

10. The display device of claim 1, wherein the separating wall is of a photoresist material.

11. The display device of claim 10, wherein the separating wall has a cross section of inverted conical structure.

12. The display device of claim 11, wherein the first substrate is a color filter substrate and the second substrate is an array substrate.

13. The display device of claim 10, wherein the first substrate is a color filter substrate and the second substrate is an array substrate.

14. The display device of claim 1, wherein the first substrate is a color filter substrate and the second substrate is an array substrate.

* * * * *